United States Patent [19]

Rothblatt

[11] 4,191,556

[45] Mar. 4, 1980

[54] PROCESS FOR REDUCING METAL OXIDES TO METAL

[76] Inventor: Stephen H. Rothblatt, 2100 Lincoln Park West, Apt. 10AN, Chicago, Ill. 60614

[21] Appl. No.: 873,415

[22] Filed: Jan. 30, 1978

[51] Int. Cl.$^2$ ............................................. B22F 9/00
[52] U.S. Cl. .............................. 75/0.5 B; 75/0.5 BA; 75/0.5 BB; 75/0.5 BC
[58] Field of Search ........... 75/0.5 B, 0.5 BA, 0.5 BB, 75/0.5 BC, 0.5 C

[56] References Cited

U.S. PATENT DOCUMENTS

| | | | |
|---|---|---|---|
| 3,475,158 | 10/1969 | Nevenschwander | 75/0.5 BB |
| 3,592,627 | 7/1971 | Nevenschwander | 75/0.5 BB |
| 3,992,193 | 11/1976 | Fey et al. | 75/0.5 B |

*Primary Examiner*—W. Stallard
*Attorney, Agent, or Firm*—Marvin N. Benn & Associates, Ltd.

[57] ABSTRACT

Iron ore is efficiently reduced by entraining particles of the ore in a flow of heated reducing gas and passing the mixture through a constriction-expansion nozzle. Metallic iron is collected from the nozzle exhaust and conveyed to a suitable storage area. Passage of the iron ore and reducing gas composition through the nozzle results in the entrained ore being brought into intimate contact with the reducing gas, which contact promotes rapid reaction rates within the nozzle. The nozzle may comprise a Venturi constriction for producing up to sonic exhausts or, when enhanced reaction rates are desired, a converging-diverging nozzle for producing supersonic exhausts accompanied by associated shock wave patterns.

6 Claims, 4 Drawing Figures

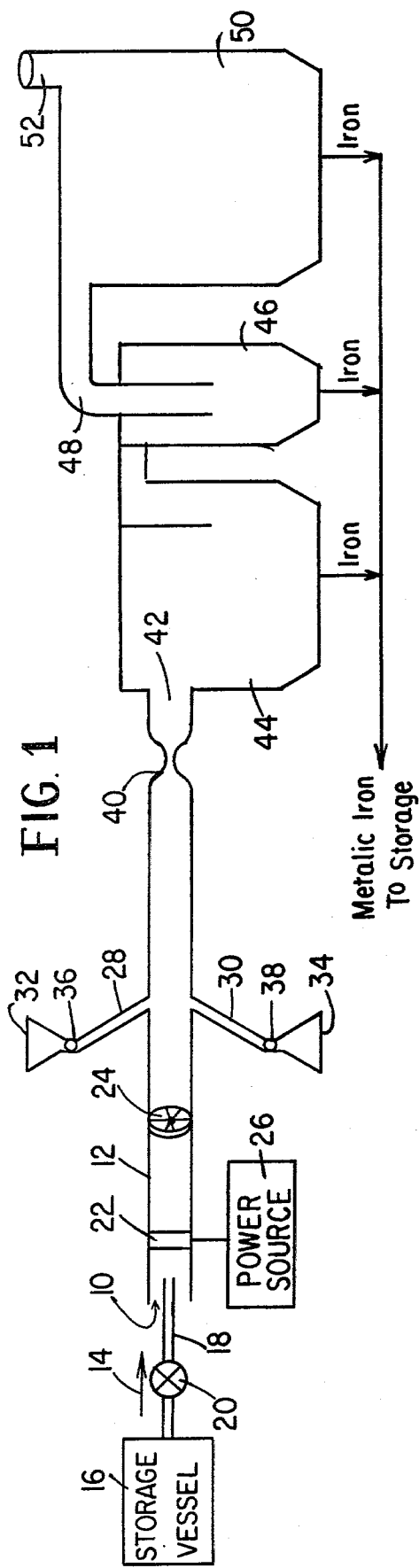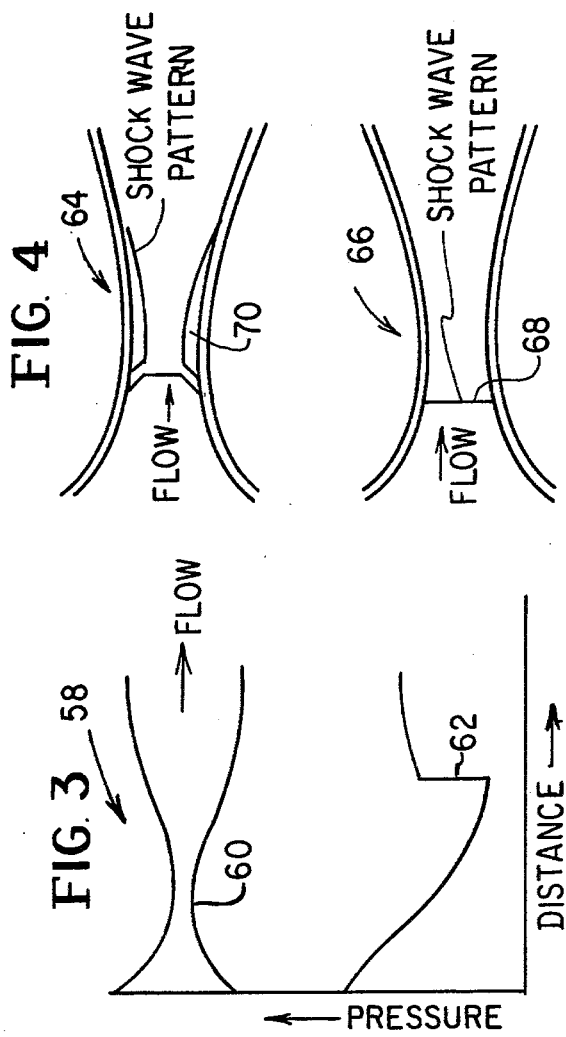

PROCESS FOR REDUCING METAL OXIDES TO METAL

BACKGROUND OF THE INVENTION

The present invention relates in general to the reduction or beneficiation of metallic ores and in particular to the reduction of iron bearing ores to a desired state.

Regardless of its end use, iron must be obtained from its ores, most often oxides such as hematite and magnetite, as the result of a reduction process. In the reduction process, oxygen chemically bound to the metal in the ore is chemically transferred to the reducing agent thus leaving the metal in its free metallic form. Typically, the reducing agent comprises carbon which may be in the form of charcoal, coke or carbon monoxide gas. Although various processes and apparatus have been used to facilitate the reduction or iron ore, the most prevalent have traditionally involved the use of blast furnaces. A blast furnace of the type suitable for reducing iron ore normally comprises a vertically disposed, cylindrical steel shell lined with a refractory material such as alumina. Weighted amounts of coke and iron ore and limestone are introduced at and descend from the top of the furnace while a continuous blast of hot air is blown into and ascends upwardly from the bottom of the furnace. As the coke and iron ore charge moves slowly downward, it rapidly increases in temperature enabling the oxides to be reduced, the coke serving to remove the oxygen from the iron ore. About two thirds of the way down the furnace, the iron melts and is deposited as molten iron in the furnace hearth. However, notwithstanding the long use of such conventional blast techniques and the numerous improvements therein, this method of reducing iron ore has proven relatively unattractive from both a pollution and safety viewpoint. Moreover, the expenses involved in operating blast furnaces further detract from their desirability.

The prior art is replete with examples of efforts on the part of industry to improve on the efficiency and effectiveness of the conventional coke oven-blast furnace process for reducing iron ore. For example, U.S. Pat. No. 3,031,293 to Meissner discloses a reducing process wherein a mixture of solid particles of iron oxide is discharged downwardly into a rising column of reducing gas so as to entrain the smaller particles within the gas until reduction is completed. In one embodiment of the disclosed apparatus, the iron oxide is introduced directly into a restricted Venturi portion of the duct through which the reducing gas is caused to flow. On the other hand, U.S. Pat. Nos. 2,287,476 and 2,365,194, both to Hodson et al, disclose iron ore reducing apparatus wherein injection nozzles are used to create a flow of reducing gases and powdered iron ore within a furnace shaft of sufficient turbulence to suspend the ore in the shaft until the ore is reduced to metal. In the former disclosure, separate nozzles are used to inject the gases and the ore, the nozzles being tangentially arranged about the periphery of the shaft, while in the latter patent an apparatus is disclosed utilizing a common nozzle to inject both the ore and reducing gas. Furthermore, U.S. Pat. No. 2,287,476 teaches the use of a furnace shaft having a converging frusto-conical upper portion for gradually increasing the upward velocity of the suspension. The use of a turbulent flow of reducing gas to promote the reduction of finely powdered iron ore by causing an intimate association therebetween is further illustrated by the process taught in U.S. Pat. No. 2,307,997 to Dill. None of the foregoing techniques, however, have gained much acceptance in the industry which still largely relies on the conventional blast furnace for producing much of its iron.

Relatively recently, attention has been directed to various fluidized bed direct reduction processes for producing metallic iron. In such a process, a reducing gas is introduced into a bed of finely divided ore particles under suitable pressure and velocity such that the ore particles become suspended in the gas rendering the bed of solid particles "fluid". U.S. Pat. No. 3,944,413 to Volk is exemplary of prior art fluidized bed reduction apparatus. While environmentally cleaner than the blast furnace approach, fluidized bed techniques suffer other drawbacks. In particular, the process is relatively expensive due primarily to the required reaction period of several hours to achieve ore reduction.

Another method and apparatus for reducing iron ore is taught in U.S. Pat. No. 3,485,487 to Bennett et al. According to the Bennett et al disclosure, iron ore is combined with a fluidizing gas such as butane in a fluidizing tank and subjected to a high velocity-pulsating flow of gases produced by explosions in the exhaust of a pulse jet engine. The explosions and resulting supersonic pressure waves uniformly heat the fluidized ore which is blown out the exhaust into a collecting chamber.

Numerous individual deficiencies characterizing the prior art iron ore reducing technologies are overcome by the present invention. In this regard, the present invention contemplates a method and apparatus for reducing metallic ores, in particular iron ores, which simultaneously offers the advantage of rapid reaction rates using relatively simple and inexpensive equipment resulting in a high tonnage output of metallic iron at reduced costs. Moreover, the process is relatively pollution free, highly energy conserving and characterized by a reduced degree of occupational hazards. The foregoing advantages are achieved by the present invention as the result of a reducing technique differing from the prior art in the manner of processing finely powdered iron ore with a reducing gas.

SUMMARY OF THE INVENTION

According to the present invention, heated reducing gasses are drawn into the inlet port of a duct and accelerated to a predetermined velocity. The gasses are then passed through a constricting-expanding type nozzle and exhausted therefrom through the outlet port of the duct into various particle separation devices. Powdered iron ore is introduced into the duct substantially upstream of the nozzle where it is entrained in the flow of reducing gasses and subsequently conveyed therewith through the nozzle and outlet port to the particle separation devices. Passage of the iron ore and reducing gas composition through the nozzle results in the entrained ore being brought into intimate contact with the reducing gasses, which contact promotes rapid reaction rates reducing the iron ore in a relatively short period of time. The nozzle may comprise a Venturi-type constriction in the duct for producing up to sonic flow rates or a converging-diverging type structure capable of achieving supersonic flow rates with associated shock wave patterns occurring just downstream of the nozzle. While reactions reducing the ore will occur at subsonic flow rates, the reaction rate will be significantly enhanced in response to the creation of patterns of sonic shock waves accompanying sonic or supersonic flow rates. The final product exhausted to and collected by the particle separation devices is a relatively pure form of metallic iron.

These and other features will be better understood by reference to the accompanying drawings to which reference is made in the following description.

BRIEF DESCRIPTION OF THE DRAWINGS

FIG. 1 is a schematic flow diagram illustrating an iron ore reduction process according to the present invention and apparatus for implementing the process.

FIG. 2 diagramatically illustrates a Venturi-type constriction nozzle.

FIG. 3 diagramatically illustrates a typical converging-diverging nozzle including the pressure distribution associated therewith.

FIG. 4 diagramatically shows the shock wave patterns accompanying different supersonic flow rates in a converging-diverging nozzle.

DESCRIPTION OF THE PREFERRED EMBODIMENTS

In describing the invention, the reduction of iron ore will be specifically referred to for purposes of illustration, it being understood that other ores or materials containing metal in reducible form may be treated in a like manner with equally favorable results.

With reference now to FIG. 1, the invention initially contemplates the introduction of heated reducing gas into the inlet port (10) of a duct (12) as schematically indicated by arrow (14). The reducing gas may comprise, for example, carbon monoxide, hydrogen, natural or synthetically derived hydrocarbons or a mixture of such gasseous reducing agents. Various entirely conventional and well known sources of such reducing gasses include coal gasification, natural gas and nuclear or solar produced hydrogen obtained from the decomposition of water. A storage vessel (16), disposed adjacent inlet port (10) of duct (12), is supplied by any one of such sources and includes suitable means such as a line (18) controlled by a valve (20) for selectively introducing the reducing gas into the duct. The reducing gas drawn from storage vessel (16) passes through a heat exchanger (22) located slightly downstream of inlet port (10) and therefrom through a high powered turbine fan (24). Heat exchanger (22), operable from a suitable power source (26), is provided for raising the temperature of the reducing gas to a level sufficient to promote the reaction of the gas with subsequently injected iron ore, while turbine fan (24) increases the velocity of the reducing gas in duct (12) to speeds to be described in further detail hereinafter.

Crushed or powdered iron ore is introduced into duct (12) downstram of turbine fan (24) via a pair of feeder lines (28) and (30) respectively coupled to hoppers (32) and (34) by a pair of valves (36) and (38). Mined iron ore normally comprises a combination of various oxides of iron as well as other non-iron impurities. To promote increased efficiency of the present invention, the iron ore is preferrably upgraded by removing the non-iron impurities therefrom prior to being supplied to hoppers (32) and (34). Various well-known and commercially available magnetic separation devices may be used for this purpose. Furthermore, it is preferrable to crush the iron ore to approximately 300 mesh although a somewhat coarser feedstock would also be acceptable. While only two feeder lines (28) and (30) are specifically shown in the drawing, it will be appreciated that diverse other feeder arrangements could be employed including, but not limited to, several points spaced longitudinally along and circumferentially about duct (12).

As the upgraded iron ore powder from hoppers (32) and (34) is introduced into duct 12 by feeder lines (28) and (30) it is entrained by the stream of reducing gas whose velocity at the ore feed points, defined by the intersection of duct (12) with feeder lines (28) and (30), is determined primarily by the operation of turbine fan (24). In this regard, it will be appreciated that more finely ground iron ore particles will require the expending of less energy on the part of turbine fan (24) to entrain the particles in the flow of reducing gas. The entrained iron ore is subsequently conveyed by the reducing gas to and through a constricting-expanding type nozzle (40) where the reduction reaction occurs and is exhausted from duct (12) through an outlet port (42). Outlet port (42) is directly coupled to an expansion and setting chamber (44) which, in turn, feeds a cyclone separator (46). Finally, cyclone separator (46) is connected via a suitable coupling (48) to an electrostatic precipitator baghouse (50) which is vented to the atmosphere by vent (52). The majority of metallic iron produced in response to the reaction occurring in nozzle (40) settles to and is removed from the bottom of chamber (44) while any remaining entrained particulate matter is ducted to cyclone separator (46). Cyclone separator (46) serves to remove and collect mid-range size particles of iron entrained within the gas, the finer sized particles being removed in an electrostatic precipitator. Finally, the metallic iron collected at the bottom of each collection device (44), (46) and (50) is conveyed by appropriate means to a suitable product storage area.

As mentioned above, the previously entrained iron ore particles are primarily reduced in nozzle (40), the reduction being achieved in the time frame of a fraction of a second. This rapid reaction rate is made possible by the intimate contact achieved between the reducing gas and the iron ore particles as they pass through nozzle (40) which, as previously explained, is of a constricting-expanding type structure. Moreover, the reduction reaction in nozzle (40) will occur at both subsonic and supersonic flow rates. In the case of subsonic flow rates, nozzle (40) may comprise a conventional Venturi-type constriction nozzle as illustrated in FIG. 2. In a nozzle of this type, if the fluid velocity is $V_1$ and the fluid pressure $P_1$ at the entrance to the converging portion (54) of the nozzle, the velocity $V_2$ at the nozzle's throat (56) increases whereas the pressure $P_2$ decreases. The acceleration thereby imparted to the fluid flowing through the nozzle facilitates the intimate contact between the reducing gas and iron ore particles thusly promoting the reducing reaction. Preferably, turbine fan (24) is operated so as to induce a fluid velocity $V_1$ at converging portion (54) of the nozzle sufficient to induce a near sonic vluid velocity $V_2$ at throat (56). The use of a Venturi-type constriction nozzle (40) in the arrangement shown in FIG. 1 is to be distinguished from the prevalent prior art practice of employing a Venturi-type constriction having a feeder disposed in its throat wherein the reduced throat pressure induces the flow of some material into the Venturi channel. The conventional aspirator pump is exemplary of such devices. In contradistinction, according to the present invention, the iron ore powder is introduced into duct (12) substantially upstream of nozzle (40) by means independent thereof in order to allow the ore particles to become adequately entrained in the reducing gas prior to being subjected to the action of nozzle (40).

The reaction rate at nozzle (40) can be significantly enhanced by selecting an appropriate nozzle (40) and by adjusting fluid velocities in duct (12) for producing sonic or supersonic fluid flow rates just downstream of the nozzle throat. The enhanced reaction rate is primarily the result of shock wave patterns set up by the sonic and supersonic fluid flow velocities. FIGS. 3 and 4 illustrate conventional constriction-expansion nozzles of the converging-diverging variety which are capable of inducing suitable shock wave patterns. In FIG. 3, the pressure distribution characterizing a converging-diverging nozzle (58) is shown in graphical form, the nozzle being operated in response to input fluid velocities determined by the setting of turbine fan (24) for providing supersonic fluid exhaust velocities. The shock wave produced just downstream of the throat (60) of nozzle (58), and represented by vertical line (62) is a sudden, thermodynamically irreversible discontinuity in the pressure distribution along the longitudinal axis of the nozzle. The induced shock wave promotes extremely intimate contact between the iron ore and reducing gas for providing reaction rates orders of magnitude greater than those achievable by conventional technologies.

FIG. 4 illustrates yet two additional converging-diverging nozzles (64) and (66) operated for producing supersonic fluid velocities and accompanying shock wave patterns. It will be appreciated that any particular nozzle induced shock wave pattern is determined by both nozzle and fluid flow parameters. Thus, by varying fluid flow velocities, identical nozzles may be characterized by diverse shock wave patterns. This principle is illustrated by nozzles (64) and (66) depicted in FIG. 4. That is, nozzle (66) operated so as to exhaust fluid at a particular supersonic velocity induces a substantially vertical shock wave pattern (68) similar to that previously discussed with regard to FIG. 3. However, nozzle (64) operated so as to exhaust fluid at a different supersonic velocity, induces a shock wave pattern (70) having a significantly different shape. In fact, the shock wave pattern (70) illustrated in association with nozzle (64) extends considerably beyond the nozzle exit. It will thus be understood that both nozzle and fluid flow parameters may be adjusted to achieve a desired reaction rate in any particular application of the invention.

What has thus been shown is a process and apparatus for directly reducing iron ore by entraining the ore in a flow of heated reducing gas and passing the suspension through a constricting-expanding nozzle to one or more particle separation devices. The technique is relatively pollution free, presents a significant decrease in occupational hazards, is relatively inexpensive to implement and is characterized by extremely rapid reaction rates.

It is to be understood that the form of the invention herewith shown and described is to be taken as a preferred embodiment of the same, and that various changes may be resorted to, without departing from the spirit of the invention or scope of the subjoined claims. Thus, for example, it will be appreciated that various additional substances may be combined with the reducing gas introduced at inlet port (10) to selectively influence the metallurgical properties of the resultant iron collected by separation devices (44), (46) and (50). Moreover, the illustrated positional arrangement of inlet port (10), heat exchanger (22) and turbine fan (24) may be varied to suit particular needs. For instance, heat exchanger (22) and turbine fan (24) may be positioned upstream of inlet port (10) and maintained independently of duct (12). Also, the angle of duct (12) and nozzle (40) relative to the horizontal may be adjusted so as to employ gravitation energy in the entrainment process. Yet further, and as mentioned hereinbefore, the number and precise positional arrangement of feeder lines, such as (28) and (30), may be tailored to meet individual needs, the essential feature being that all such lines be disposed upstream of nozzle (40).

What is claimed is:

1. A process for reducing metal oxides to metal comprising the steps of:
   establishing a flow of heat reducing gas;
   entraining particles of a metal oxide in said flow of heated reducing gas; and
   directing said flow of heated reducing gas and entrained particles through a constriction-expansion nozzle for promoting a reduction reaction therebetween.

2. The process according to claim 1 including the further step of collecting reduced metal from the exhaust of said constriction-expansion nozzle.

3. The process according to claim 1 wherein said establishing step comprises the step of establishing a flow of heated reducing gas at a velocity sufficient for promoting intimate contact between said entrained particles and said reducing gas in said constriction-expansion nozzle for facilitating a reduction reaction therein.

4. The process according to claim 3 wherein said constriction-expansion nozzle comprises a Venturi constriction nozzle and wherein said established velocity is characterized for producing a subsonic exhaust from said nozzle.

5. The process according to claim 3 wherein said constriction-expansion nozzle comprises a converging-diverging nozzle capable of inducing supersonic flow rates therethrough and wherein said established velocity is characterized for producing at least sonic exhausts from said nozzle accompanied by associated shock wave patterns.

6. The process according to claim 1 including the step of heating said reducing gas to a level promotive of a reduction reaction between said reducing gas and said entrained particles.

* * * * *